US008195921B2

(12) United States Patent
Golla et al.

(10) Patent No.: US 8,195,921 B2
(45) Date of Patent: Jun. 5, 2012

(54) METHOD AND APPARATUS FOR DECODING MULTITHREADED INSTRUCTIONS OF A MICROPROCESSOR

(75) Inventors: Robert Golla, Round Rock, TX (US); Manish Shah, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 641 days.

(21) Appl. No.: 12/170,144

(22) Filed: Jul. 9, 2008

(65) Prior Publication Data

US 2010/0011190 A1    Jan. 14, 2010

(51) Int. Cl.
    G06F 15/00    (2006.01)
(52) U.S. Cl. .......................................... 712/16; 712/208
(58) Field of Classification Search .................. 712/16, 712/208
    See application file for complete search history.

(56) References Cited

U.S. PATENT DOCUMENTS

| | | | | |
|---|---|---|---|---|
| 4,394,736 A | * | 7/1983 | Bernstein et al. | 711/215 |
| 4,901,235 A | * | 2/1990 | Vora et al. | 712/247 |
| 5,559,974 A | * | 9/1996 | Boggs et al. | 712/217 |
| 5,566,298 A | * | 10/1996 | Boggs et al. | 714/10 |
| 5,630,083 A | * | 5/1997 | Carbine et al. | 712/212 |
| 6,336,182 B1 | * | 1/2002 | Derrick et al. | 712/204 |
| 6,624,818 B1 | * | 9/2003 | Mantor et al. | 345/522 |
| 7,082,104 B2 | * | 7/2006 | Wolrich et al. | 370/236 |
| 7,093,109 B1 | * | 8/2006 | Davis et al. | 712/228 |
| 7,487,505 B2 | * | 2/2009 | Rosenbluth et al. | 718/104 |
| 7,529,914 B2 | * | 5/2009 | Saha et al. | 712/220 |
| 7,555,630 B2 | * | 6/2009 | Jain et al. | 712/10 |
| 7,751,402 B2 | * | 7/2010 | Wolrich et al. | 370/394 |
| 2002/0169948 A1 | * | 11/2002 | Kondo et al. | 712/245 |
| 2002/0172210 A1 | * | 11/2002 | Wolrich et al. | 370/411 |
| 2004/0054875 A1 | * | 3/2004 | Segelken | 712/214 |
| 2004/0054877 A1 | * | 3/2004 | Macy et al. | 712/221 |
| 2005/0108508 A1 | * | 5/2005 | Hebda et al. | 712/214 |
| 2006/0095894 A1 | * | 5/2006 | Wilde et al. | 717/113 |
| 2006/0146864 A1 | * | 7/2006 | Rosenbluth et al. | 370/458 |
| 2007/0088974 A1 | * | 4/2007 | Chandwani et al. | 714/6 |
| 2007/0143730 A1 | * | 6/2007 | Kakui | 716/18 |
| 2008/0046689 A1 | * | 2/2008 | Chen et al. | 712/24 |

* cited by examiner

*Primary Examiner* — Idriss N Alrobaye
(74) *Attorney, Agent, or Firm* — Polsinelli Shughart PC (57) ABSTRACT

A microprocessor capable of decoding a plurality of instructions associated with a plurality of threads is disclosed. The microprocessor may comprise a first array comprising a first plurality of microcode operations associated with an instruction from within the plurality of instructions, the first array capable of delivering a first predetermined number of microcode operations from the first plurality of microcode operations. The microprocessor may further comprise a second array comprising a second plurality of microcode operations, the second array capable of providing one or more of the second plurality of microcode operations in the event that the instruction decodes into more than the first predetermined number of microcode operations. The microprocessor may further comprise an arbiter coupled between the first and second arrays, where the arbiter may determine which thread from the plurality of threads accesses the second array.

14 Claims, 4 Drawing Sheets

METHOD AND APPARATUS FOR DECODING MULTITHREADED INSTRUCTIONS OF A MICROPROCESSOR

FIELD OF THE INVENTION

The various embodiments of the present invention relate to decoding multithreaded instructions. More specifically, apparatuses, processes, systems and methods are disclosed for decoding a plurality of complex instructions associated with a plurality of threads.

BACKGROUND OF THE INVENTION

Computers are ubiquitous in today's society. They come in all different varieties and can be found in places such as automobiles, the grocery store, banks, personal digital assistants, cell phones, as well as in many businesses. As will be appreciated by almost anyone owning a computer, the software being used on successive generations of computers continues to become more and more sophisticated. This increasing sophistication is due, in part, to the availability of computers with complex instruction sets, sometimes referred to as complex instruction set computers (CISC). Examples of CISC instructions include the x86 instruction set architecture (ISA), which is widely available today.

Complex instruction sets, such as the x86 ISA, may include complex instructions that do not execute efficiently in modern microprocessors because they take multiple processor cycles to execute. In order to process computer programs as quickly as possible, it is often the goal of a microprocessor to execute instructions in a single clock cycle. Thus, most modern microprocessors may decode the complex instructions into a series of more manageable microcode-operations (μ-ops) that execute in a single cycle. These μ-ops may be stored in a read only memory (ROM) that is integrated within the processor and referred to as a μcode ROM. A hardware sequencer, which also may be integrated within the microprocessor, may track the μ-ops fetched from the μcode ROM and provide addresses for the next μ-op to be executed.

Many microprocessors also may implement hardware threading to reduce the amount of time that the microprocessor is idle. Since the μcode ROM and the hardware sequencer may be integrated within the microprocessor, where space is at a premium, there may only be a single μcode ROM and/or sequencer to be shared among multiple hardware threads. However, sharing a single μcode ROM among multiple threads may create problems. For example, the microprocessor may need to arbitrate between multiple threads to determine which thread can access the μcode ROM. Also, the microprocessor may need to coordinate address calculation by the sequencer among the many threads. These problems are only exacerbated as processor operating frequencies increase. That is, at high clock frequencies, the operations involved in arbitrating and selecting threads—e.g., thread arbitration, address generation, reading the instructions from the μcode ROM—may be difficult to complete in a single clock cycle.

Furthermore, as the microprocessor begins to have difficulty executing the complex multithreaded instructions within the time allotted by a single clock cycle, the physical placement of the μcode ROM and/or sequencer within the microprocessor also may begin to affect performance. For example, the μcode ROM and/or sequencer may be physically placed a far distance away from blocks of the microprocessor to which they deliver μ-op code. In general, the further two blocks are away from each other within the microprocessor, the more time it may take to deliver data between them. Thus, the physical placement of blocks may result in the operations of arbitrating and selecting threads taking more than a single clock cycle. Thus, methods and apparatuses are needed that address one or more of these problems.

SUMMARY

One or more embodiments may include a microprocessor capable of decoding a plurality of instructions associated with a plurality of threads. The microprocessor may comprise a first array comprising a first plurality of microcode operations associated with an instruction from within the plurality, the first array capable of delivering a first predetermined number of microcode operations from the first plurality of microcode operations. The microprocessor may further comprise a second array comprising a second plurality of microcode operations, the second array capable of providing one or more of the second plurality of microcode operations in the event that the instruction decodes into more than the first predetermined number of microcode operations. The microprocessor may further comprise an arbiter coupled between the first and second arrays, where the arbiter may determine which thread from the plurality of threads may access the second array.

Another embodiment may include a computer system comprising a user input device, a microprocessor coupled to the user input device, where the microprocessor may be capable of decoding a plurality of instructions associated with a plurality of threads. The microprocessor may include a first array comprising a first plurality of microcode operations associated with an instruction from within the plurality of the instructions, the first array capable of delivering a first predetermined number of microcode operations from the first plurality of microcode operations. The microprocessor may further include a second array comprising a second plurality of microcode operations, the second array capable of providing one or more of the second plurality of microcode operations in the event that the instruction decodes into more than the first predetermined number of microcode operations. The microprocessor may further include an arbiter coupled between the first and second arrays, wherein the arbiter determines which thread from the plurality of threads accesses the second array.

Another embodiment may include a method of decoding a plurality of instructions associated with a plurality of threads. The method may include the acts of delivering a first predetermined number of microcode operations from a first array that may comprise a first plurality of microcode operations associated with an instruction within the plurality of instructions, providing one or more microcode operations from a second plurality of microcode operations, in a second array, in the event that the instruction decodes into more than the first predetermined number of microcode operations, and arbitrating between two threads from the plurality of threads to determine which thread accesses the second array.

BRIEF DESCRIPTION OF THE DRAWINGS

For a detailed description of the various embodiments of the invention, reference will now be made to the accompanying drawings, in which.

DETAILED DESCRIPTION

The term CISC, as used herein, generally refers to instructions that may require multiple processor cycles to execute as opposed to reduced instruction set computer (RISC) instructions, which execute in a single processor cycle. While this disclosure will focus on CISC instructions from the x86 ISA, it should be appreciated that this disclosure has broad application and applies generally to the efficient decoding of CISC instructions executing on a multi-threaded processor.

Some embodiments may include an apparatus and method that provides for efficiently decoding CISC and/or x86 instructions in a multi-threaded processor. The x86 instructions may be micro-coded into one or more µ-ops that execute in a single cycle. Decoding these micro-coded instructions may include separating the instructions into two or more classes. A first of the two or more classes may include the instructions that may be decoded into two or less µ-ops, where each µ-op is capable of being executed in a single processor cycle. Instructions in this first class may be stored in a location other than the µcode ROM. A second of the two or more classes may include the instructions that need more than two µ-ops to execute. This second class of instructions may be stored in the µcode ROM and implement a µcode ROM arbiter that may assist in managing accesses to the µcode ROM between multiple threads. As a result of separating instructions into these two classes and implementing a µcode ROM arbiter, an average decode throughput of one µ-op per cycle for complex CISC instructions (such as x86 instructions) may be achieved.

Figure 1:
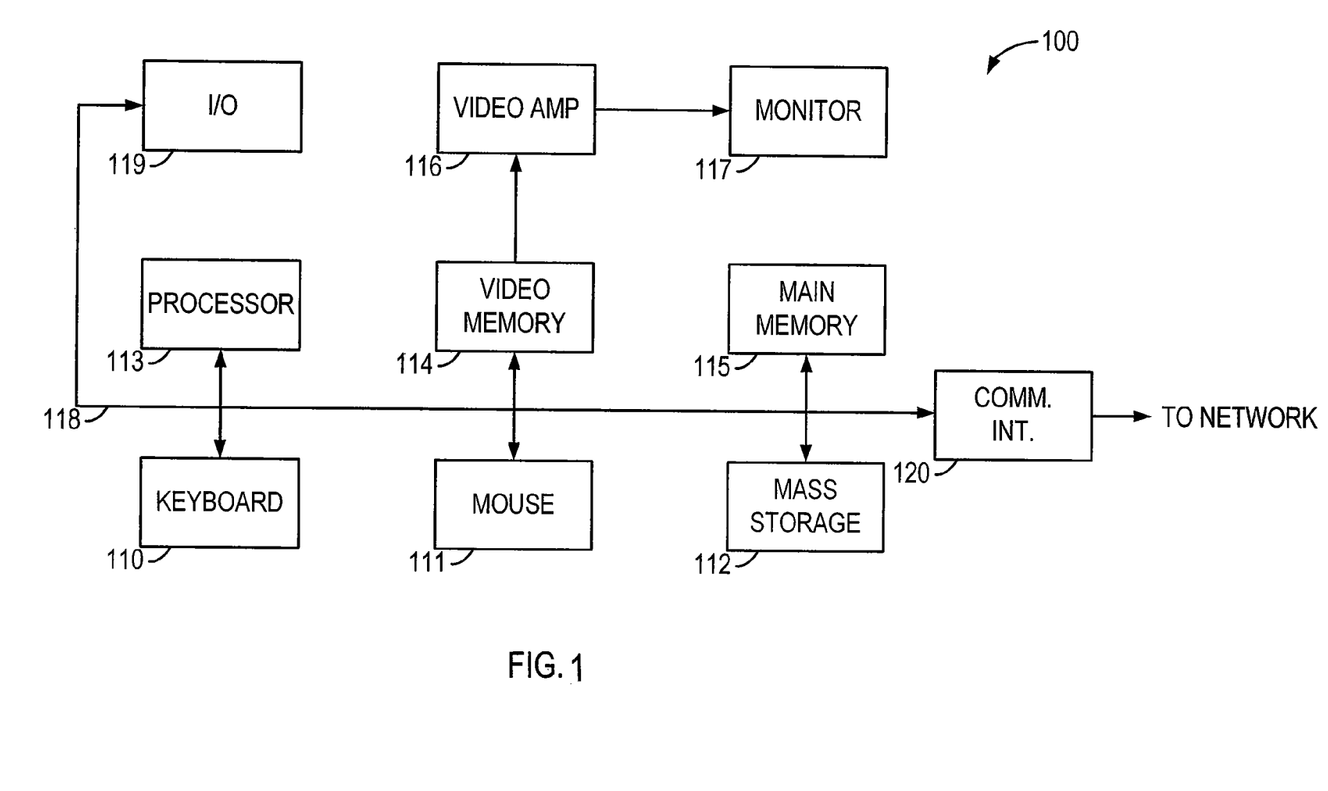
FIG. 1 illustrates an exemplary computer system.

FIG. 1 shows an exemplary computer system 100 that may be capable of executing x86 instructions. In some embodiments, the computer system 100 may be an implementation of enterprise level computers, such as one or more blade-type servers within an enterprise. In other embodiments, the computer system 100 may be a personal computer and/or a handheld electronic device. A keyboard 110 and mouse 111 may be coupled to the computer system 100 via a system bus 118. The keyboard 110 and mouse 111, in one example, may introduce user input to computer system 100 and communicate that user input to a processor 113. Other suitable input devices may be used in addition to, or in place of, mouse 111 and keyboard 110. An input/output unit 119 (I/O) coupled to system bus 118 represents such I/O elements as a printer, audio/video (A/V) I/O, etc.

Computer 100 also may include a video memory 114, a main memory 115 and a mass storage 112, all coupled to system bus 118 along with keyboard 110, mouse 111 and processor 113. Mass storage 112 may include both fixed and removable media, such as magnetic, optical or magnetic optical storage systems and any other available mass storage technology. Bus 118 may contain, for example, address lines for addressing video memory 114 or main memory 115. System bus 118 also includes, for example, a data bus for transferring data between and among the components, such as processor 113, main memory 115, video memory 114 and mass storage 112. Video memory 114 may be a dual-ported video random access memory. One port of video memory 114, in one example, is coupled to video amplifier 116, which is used to drive a monitor 117. Monitor 117 may be any type of monitor suitable for displaying graphic images, such as a cathode ray tube monitor (CRT), flat panel, or liquid crystal display (LCD) monitor or any other suitable data presentation device.

In some embodiments, processor 113 is a SPARC® microprocessor from Sun Microsystems, Inc., or a microprocessor manufactured by Motorola, such as the 680XX0 processor, or a microprocessor manufactured by Intel, such as the 80X86, or Pentium® processor. Any other suitable microprocessor or microcomputer may be utilized, however. As will be described in further detail below, the processor 113 may be capable of concurrently executing multiple threads, where each thread may include one or more x86 instructions. In some embodiments, this may include switching between threads during each processor cycle. That is, the processor 113 may execute one or more instructions from a first thread during one cycle and execute one or more instructions from a different thread during subsequent cycle.

Computer 100 also may include a communication interface 120 coupled to bus 118. Communication interface 120 provides a two-way data communication coupling via a network link. For example, communication interface 120 may be an integrated services digital network (ISDN) card or a modem, a local area network (LAN) card, or a cable modem or wireless interface. In any such implementation, communication interface 120 sends and receives electrical, electromagnetic or optical signals which carry digital data streams representing various types of information.

Code received by computer 100 may be executed by processor 113 as it is received, and/or stored in mass storage 112, or other non-volatile storage for later execution. In this manner, computer 100 may obtain application code in a variety of forms. Application code may be embodied in any form of computer program product such as a medium configured to store or transport computer readable code or data, or in which computer readable code or data may be embedded. Examples of computer program products include CD-ROM discs, ROM cards, floppy disks, magnetic tapes, computer hard drives, servers on a network, and solid state memory devices.

Figure 2:
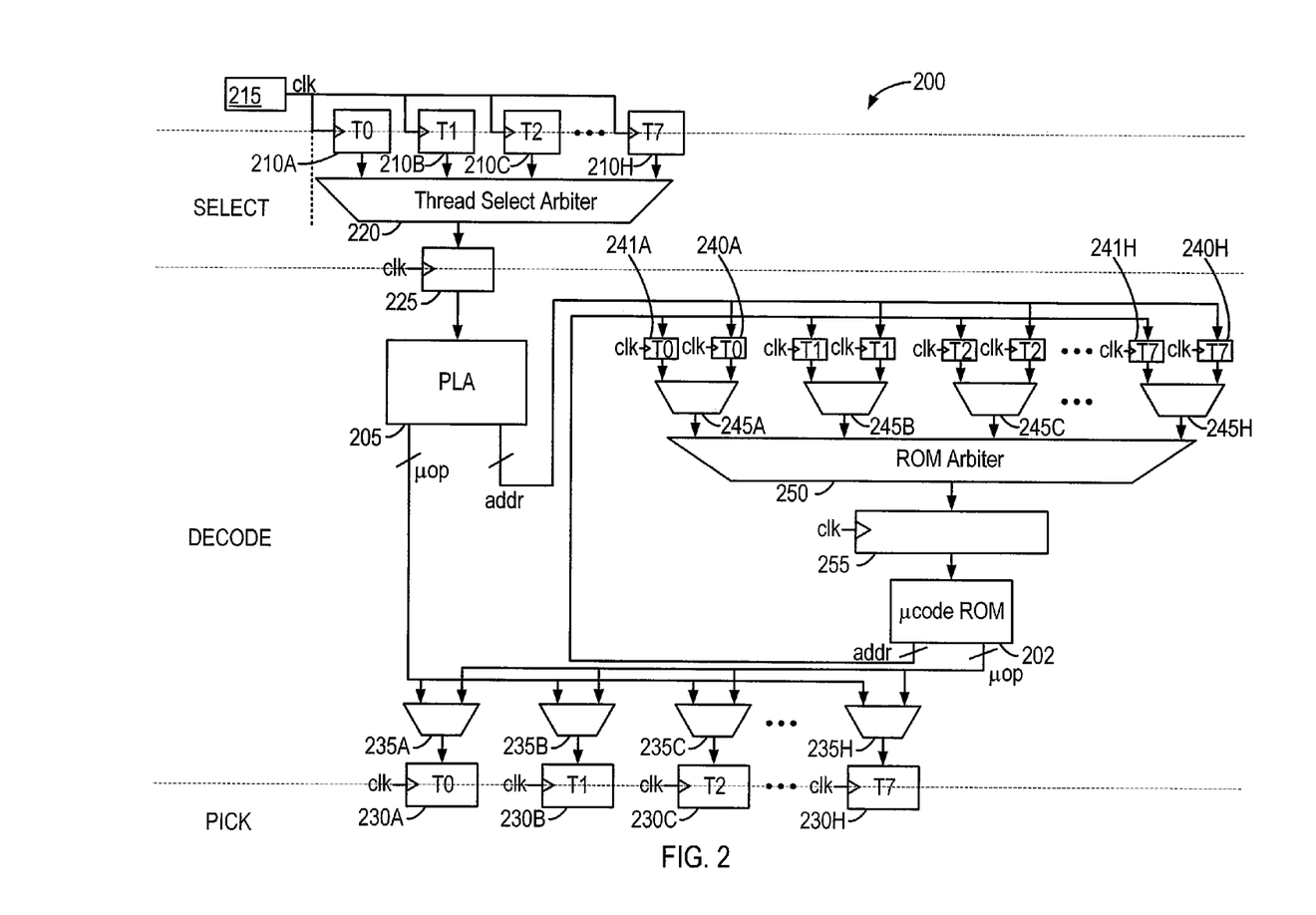
FIG. 2 illustrates an exemplary μ-op decoding system.

Referring to FIG. 2, a system 200 is shown for decoding the one or more µ-ops. In some embodiments, the µ-op decoding system 200 may be integrated within the processor 113. As mentioned previously, the threads being executed on the processor 113 may include one or more x86 instructions that may require multiple processor cycles to execute. These x86 instructions may be coded into a plurality of µ-ops, where each µ-op is capable of being executed in a single processor cycle. Based on the relative complexity of the x86 instructions, the µ-ops may be selectively stored in different locations within the decoding system 200.

In some embodiments, the system 200 may include a µcode ROM 202 for storing µ-ops associated with complex x86 instructions and a programmable logic array (PLA) 205 for storing µ-ops associated with non-complex x86 instructions and/or initial µ-ops associated with complex x86 instructions. The term "complex x86 instruction", as used herein, refers to an instruction that decodes into more than two µ-ops, where each µ-op may consume a single processor cycle. Thus, the term "non-complex x86 instruction" refers to an instruction that decodes into two or fewer µ-ops. During decode operations, the PLA 205 may store µ-ops for the instructions in the various threads being executed by the processor 113. In addition, in the event that the instruction may require more µ-ops than are stored in the PLA 205, the PLA 205 may store the starting address of the instruction's additional µ-ops within the µcode ROM 202. Applying an address to µcode ROM 202 (e.g., from the PLA 205) may result in returning a data word stored at that address. In the case of a µcode ROM 202, the data words stored at these addresses may correspond to one or more µ-ops associated with a complex x86 instruction. As will be described in detail below, in some embodiments, the size of the data word may be two μ-ops.

The decoding system 200 further may include a plurality of thread select buffers 210A-H that contain the instructions for various threads being executed by the processor 113 (where the thread select buffer 210A may correspond to instructions from thread T0, the thread select buffer 210B may correspond to instructions from thread T1, and so on). Although a particular number of threads are shown in FIG. 2, it should be appreciated that any number of threads may be executed concurrently by the processor 113. Thus, the configuration shown in FIG. 2 may vary based on the number of threads implemented in any particular embodiment.

In some embodiments, these buffers 210A-H may be implemented as one or more flip-flops and/or registers. As shown in FIG. 2, the buffers 210A-H may include a CLK signal from a timing circuit 215. The timing circuit 215 may be integrated within the processor 113 in some embodiments. In other embodiments, the CLK signal may be provided from outside the processor. The timing circuit 215 may take a variety of physical forms, including in some embodiments, a crystal based oscillator with relatively low phase noise and/or clock jitter. In other embodiments, the timing circuit 215 may be a frequency synthesized signal based on a crystal oscillator signal, such as a phase locked loop (PLL) synthesizer.

Regardless of the particular implementation of the timing circuit 215, the CLK signal generated by the timing circuit 215 may be configured to coincide with the master clock signal of the processor 113. As a result, the instructions in the thread select buffers 210A-H may be updated coincident with the operation of the processor 113. For example, in some embodiments, the instruction in at least one of the thread select buffers 210A-H may be transferred to subsequent portions of the system 200 with each processor cycle. Similarly, additional buffers (such as the decode buffer 225, the pick buffers 230A-H, the arbitration buffers 240A-H and 241A-H, and the μcode input buffer 255 all described below) may be implemented throughout the system 200 such that data may progress through these buffers to various portions of the system 200 with successive processor cycles. Thus, the decoding system 200 may decode the incoming x86 instructions from the various threads using a plurality of decoding pipeline stages. As shown in FIG. 2, the various decode pipeline stages may include a select stage, a decode stage, and a pick stage.

Figure 3:
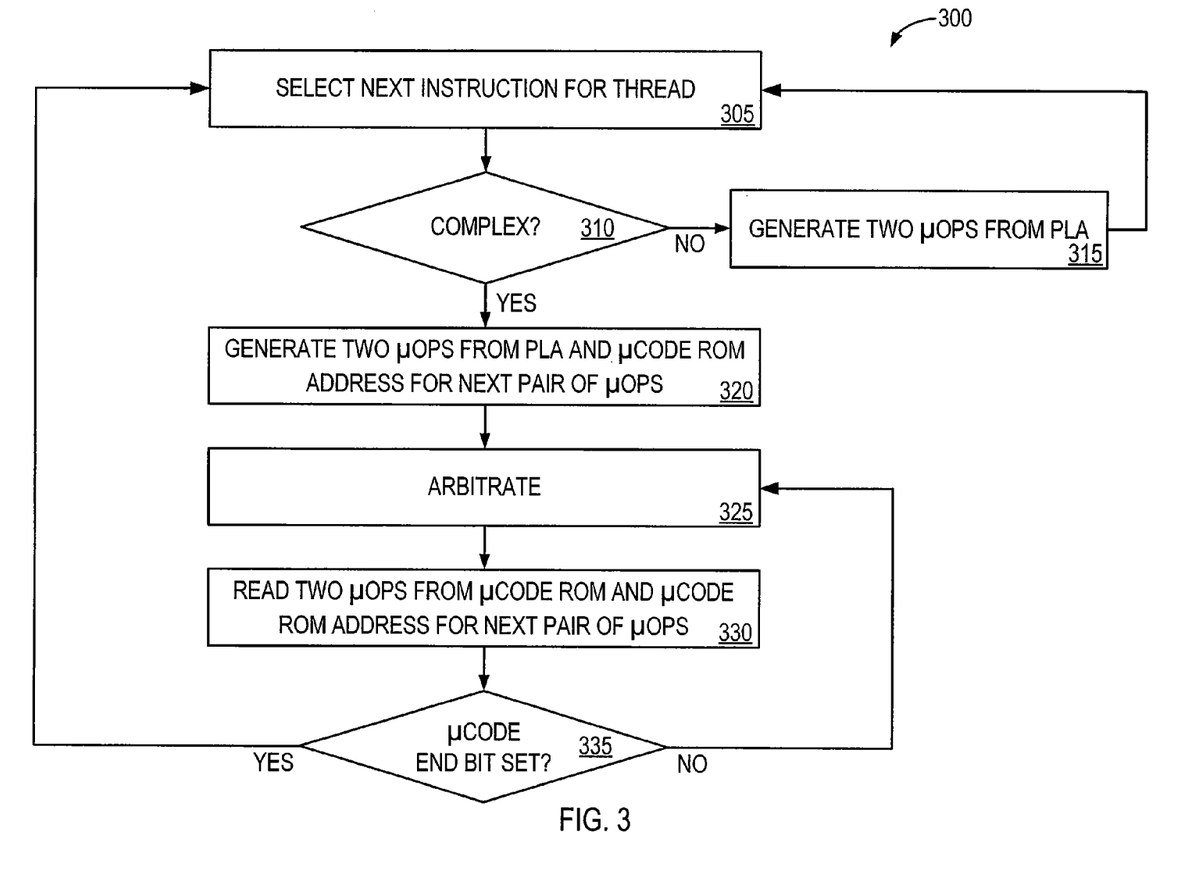
FIG. 3 illustrates an exemplary series of operations for decoding μ-ops.

FIG. 3 depicts an exemplary series of operations 300 that may be implemented to decode μ-ops that may have been previously stored into the μcode ROM 202 and/or the PLA 205 based on their complexity. Referring now to both FIGS. 2 and 3, the select pipe stage may include a thread select buffer arbiter 220 coupled to the thread select buffers 210A-H. In some embodiments, the thread select buffers 210A-H may store x86 instructions. During operation, the arbiter 220 may select instructions from one of the threads based on whether the thread has been recently used. This is shown as operation 305. For example, in some embodiments, the arbiter 220 may implement a least-recently-used (LRU) operation on the contents of the thread select buffers 210A-H to schedule for execution a thread that has been accessed less than all the other threads. The arbiter 220 may then pass instructions from the selected thread to a decode buffer 225, where the particular instructions associated with that thread may be selectively decoded based upon the complexity of the x86 instruction. As mentioned previously, the decode buffer 225 may couple to the CLK signal from the timing circuit 225 such that information in the decode buffer 225 is advanced to other portions of the system 200 for each clock cycle of the processor 113.

As mentioned above, the μ-ops associated with any particular x86 instruction may be selectively stored within the PLA 205 and the μcode ROM 202 if they were complex, or alternatively, stored in the PLA 205 if they were non-complex. In operation 310, the complexity of the instruction in the decode buffer 225 may be determined. For example, in some embodiments, the contents of the decode buffer 225 may be compared to a list of non-complex x86 instructions that are capable of being executed in two or less μ-ops. In the event that the instruction in the decode buffer 225 can be decoded in two or less μ-ops, then the corresponding μ-ops may be provided from the PLA 205 and placed into a pick buffer 230A-H corresponding to the particular thread being decoded where the pick buffer 230A may correspond to thread T0, the pick buffer 230B may correspond to thread T1, and so on. This is illustrated in operation 315. In some embodiments, the PLA 205 may provide the two or fewer μ-ops corresponding to the x86 instruction in a single processor cycle, and therefore, some embodiments may include the ability to generate two μ-ops per processor cycle. As indicated in FIG. 3, once the PLA 205 generates two μ-ops and issues them to the pick buffers 230A-H, control may flow back to block 305 to select the next instruction for a given thread to be decoded.

The pick buffers 230A-H may be the final decode stage in the system 200 such that the processor 113 may execute μ-ops stored in pick buffers 230A-H. The pick buffers 230A-H may couple to the PLA 205 via one or more muxes 235A-H, where the mux 235A may correspond to thread T0, the mux 235B may correspond to thread T1, and so on. The one or more muxes 235A-H may couple to the μcode ROM 202 so as to allow the pick buffers 230A-H to be selectively filled with μ-ops from either the PLA 205 and/or the μcode ROM 202. In the event that the instruction in the decode buffer 225 cannot be decoded in two or less μ-ops, then the corresponding μ-ops may be satisfied from the PLA 205 in addition to being satisfied from the μcode ROM 202. As shown in operation 320, if the x86 instruction is complex (i.e., requiring more than two μ-ops), then the PLA 205 may generate the first two μ-ops and also generate an address in the μcode ROM 202 that corresponds to one or more subsequent μ-ops associated with the complex x86 instruction. Thus, the PLA 205 may be consulted as the first decode stage for both complex and non-complex instructions.

As mentioned previously, the μcode ROM 202 may be shared among the various threads so as to conserve the integrated circuit area consumed by the processor 113. To facilitate the sharing of the μcode ROM 202 between various threads, the decode stage of the system 200 may engage in thread sequencer arbitration. The system 200 may implement arbitration buffers 240A-H and 241A-H, muxes 245A-H, arbiter 250, and μcode input buffer 255 to arbitrate between the various instruction threads as shown in operation 325.

In some embodiments, the arbiter 250 may determine a thread for decode from the μcode ROM 202 using an LRU operation akin to the arbitration of the thread select arbiter 220. Note, however, that the thread select arbiter 220 and the μcode arbiter 250 may select different threads based on the same LRU technique. That is, the least recently used thread may be different at the μcode ROM arbiter 250 than at the thread select arbiter 220.

The arbitration buffers 240A-H may store the μcode ROM address from the PLA 205 (which was generated by the PLA 205 during operation 320). As shown, the buffers 240A-H may each correspond to a different thread. The arbitration buffers 241A-H may store subsequent μcode ROM addresses generated by the μcode ROM 202. Similar to the buffers 240A-H, the buffers 241 A-H may each correspond to a different thread. The μcode ROM 202 may generate these subsequent addresses because the complex x86 instructions, which are being decoded by the system 200, may require multiple μ-ops and the number of μ-ops provided by the μcode ROM 202 for each cycle may be fixed. Because the address for subsequent μ-ops within the μcode ROM 202 may be provided out of the μcode ROM 202 itself, the μcode ROM 202 may be configured to deliver a variable number of μ-ops within successive cycles. For example, in some embodiments, the μcode ROM 202 may provide two μ-ops and an address for subsequent μ-ops during a first processor cycle. In this example, during the second cycle, the μcode ROM 202 may provide no further μ-ops so as to allow the subsequent addresses to be queued for reading from the μcode ROM 202. Thus, between the first and second cycles there may be an average μ-op throughput of at least one μ-op per processor cycle for complex x86 instructions executing in a multithreaded environment, while still allowing subsequent μcode ROM addresses to be queued for decoding in subsequent cycles. This is shown in operation 330. Note that other embodiments may provide different numbers of μ-ops per cycle to achieve the same throughput, e.g., three μ-ops in the first cycle and no further μ-ops in the second and third cycles for an average of one μ-op per cycle.

Because of the fixed nature of the μcode ROM 202 and the fact that some complex x86 instructions may consume more than this fixed number of μ-ops per cycle, the μcode ROM 202 may need to generate additional μ-ops on subsequent processor cycles. For example, if a complex x86 instruction requires more than four μ-ops, the μcode ROM 202 may need to be re-consulted. In this example, the first two μ-ops may be provided by the PLA 205 during operation 320, and the next two may be provided by looking up two μ-ops at the μcode ROM address provided by the PLA 205. If these four μ-ops are determined, and additional μ-ops are required to execute the complex x86 instruction, a subsequent μ-op address may need to be generated by the μcode ROM 202. The μcode ROM 202 may indicate whether subsequent μ-op addresses are being issued by setting an "end bit" to indicate the end of μ-ops associated with a particular complex instruction. The reading of this end bit is illustrated in operation 335.

During operation, the muxes 245A-H initially may be configured to select the address from the PLA 205 (buffers 240A-H). If the PLA 205 indicates that the instruction is associated with μ-op code in the μcode ROM 205, then the muxes 245A-H may be configured to select the address from the μcode ROM 205 (buffers 241A-H) until the end bit is set. Upon detection of the end bit being set, the muxes 245A-H again may select the address from the PLA 205 (buffers 240A-H). Thus, the input select for the muxes 245A-H may be configured so as to allow the first μ-op address to come from the PLA 205 and subsequent addresses come from the μcode ROM 202 until the end bit is encountered. Once the end bit is encountered, this may indicate the end of the μ-op sequence from the μcode ROM 202, and control may flow back to operation 305.

If a subsequent μ-op address was generated by the μcode ROM 202 as it provided its two μ-ops (i.e., the end bit is not set), then the muxes 245A-H may select the subsequent μ-op address from the μcode ROM 202 (stored in the buffers 241A-H) rather than the subsequent μ-op address from the PLA 205 (stored in the buffers 240A-H). This is shown in FIG. 3 as control may flow back to operation 325 where arbitration again may be performed between threads, including the threads that have these subsequent μ-ops as identified by the end bit. Also, if the end bit is not set, and an address is present for a subsequent μ-op, then the muxes 245A-H may select the buffers 241A-H (which include the additional μ-op addresses) rather than the buffers 240A-H, which include addresses from the PLA 205. In this manner, initial μ-op addresses may come from the PLA 205 (shown in operation 320) and subsequent μ-ops addresses may come from the μcode ROM 202 (shown in operation 330).

If, on the other hand, no subsequent address was generated by the μcode ROM 202 when it provided its two μ-ops (i.e., the end bit is set), then control may flow back to block 305 where the thread select arbiter 220 may select the next instruction for a given thread for execution.

Figure 4:
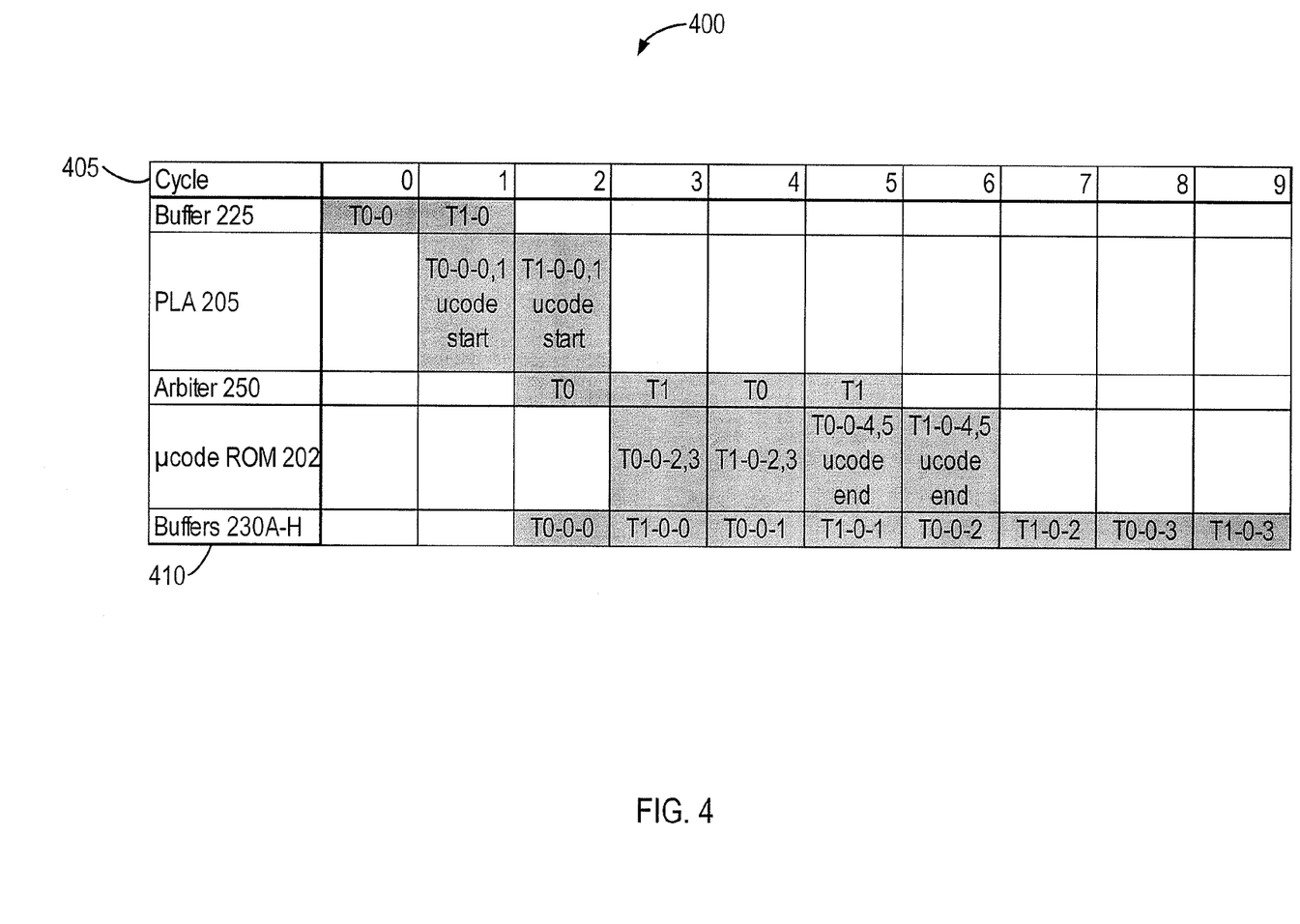
FIG. 4 illustrates an exemplary execution sequence of multithreaded instructions.

FIG. 4 represents a table 400 that illustrates an exemplary execution of multithreaded instructions by the processor 113. For the sake of discussing the timing of various decode operations FIG. 4 refers to the decode activities of the blocks shown in FIG. 2. It should be recognized that this discussion is merely illustrative of the possible timing of decoding complex x86 instructions on a multithreaded processor and is not intended to require a certain order of execution of decode activities.

Various cycles of the processor 405 are shown in the horizontal header of the table 400, with execution beginning in CYCLE_0. Different portions of the system 200 correspond to the first column 410 of the table 400 as indicated. The progress of multithreaded instructions according to at least one embodiment is illustrated by examining the contents of each portion of the system 200 during subsequent processor cycles. The convention used for the entries of the table 400 may include (in this order): thread number, instruction number within the thread, and the μ-op within the particular instruction. Also, the numbering convention for the CYCLES and the threads is 0 for the first, 1 for the second, 2 for the third, 3 for the fourth and so on. For example, based on these conventions, an entry T0-0-0 may correspond to the first thread (T0), the first instruction in thread (T0-0), and the first μ-op within the first instruction (T0-0-0). Referring to FIG. 4, first and second μcoded threads T0 and T1 are shown. In CYCLE_0, the decode buffer 225 may include first thread T0, for example, because the arbiter 220 determined that the thread T0 is the least recently used thread. The first instruction in the thread T0 may be decoded by the PLA 205 during CYCLE_1.

During CYCLE_1, at the same time as the first instruction of first thread (T0-0) is being decoded into its first two μ-ops by the PLA 205, the arbiter 220 may determine that thread T1 is the least recently used thread and store it in the decode buffer 225. The exemplary thread T0 may include a complex first instruction (T0-0) that requires more than two μ-ops. The PLA 205 may generate an address for the additional μ-ops within the μcode ROM 202.

During CYCLE_2, while the T1 thread is being decoded by the PLA 205, arbitration may be performed (e.g., by using the muxes 245A-H and arbiter 250) to determine the thread that will have control of the μcode ROM 202. FIG. 4 illustrates the situation where the μcode address from the T0 thread is selected for access to the μcode ROM 202 during CYCLE_2. Also, during CYCLE_2, the first μ-op associated with the first instruction of the first thread (T0-0-0), from the PLA 205, may be passed to the pick buffers 230A-H and queued for execution by the processor 113.

During CYCLE 3, arbitration may again be performed (e.g., by using the muxes 245A-H and arbiter 250) to determine the thread that will have control of the μcode ROM 202. FIG. 4 now illustrates the situation where the μcode address from the T1 thread is selected for access to the μcode ROM 202 during CYCLE_3. Concurrently in CYCLE_3, the second and third μ-ops of the first instruction from the first thread (T0-0-2,3) may be decoded by the µcode ROM 202 into the second and third µ-ops. Also, during CYCLE_3, the first µ-op associated with the first instruction of the second thread (T1-0-0), from the PLA 205, may be passed to the pick buffers 230A-H and queued for execution by the processor 113.

During CYCLE_4 the first thread T0 wins arbitration to the µcode ROM 202 to decode additional µ-ops. Also, during CYCLE_4 the third and fourth µ-ops from the first instruction of the second thread (T1-0-2,3) may be decoded by the µcode ROM 202. At the same time, during CYCLE_4, the second µ-op from the first instruction of the first thread (T0-0-1) may be passed to the pick buffers 230A-H and queued for execution by the processor 113.

Examining the various pick buffers queued for execution in FIG. 4 it can be appreciated that the processor may efficiently share decode operations of the µcode ROM 202 between the first and second threads. Thus, in CYCLE_5, the processor may resume operation where it left off in CYCLE_3—i.e., at the second µ-op of the first instruction of the second thread (T1-0-1), which was decoded by the PLA 205 in CYCLE_2. Likewise, in CYCLE_6, the processor may resume operation where it left off in CYCLE_4—i.e., at the third µ-op of the first instruction of the first instruction (T0-0-2), which in this case was decoded by the µcode ROM 205. Notably, every two processor cycles may result in two µ-ops being decoded and queued for execution, and as a result, an average decode throughput from the µcode ROM 202 to be at least one µ-op per processor cycle for complex x86 instructions executing in a multithreaded environment.

The above discussion is meant to be illustrative of the principles and various embodiments of the present invention. Numerous variations and modifications will become apparent once the above disclosure is fully appreciated. For example, in some embodiments, the processor 113 could be a superscalar processor that executes multiple instructions per processor cycle. Furthermore, in some embodiments, the processor 113 may be capable of performing out of order instruction execution. The claims should be interpreted to include any and all such variations and modifications. In addition, the above description has broad application, and the discussion of any embodiment is meant only to be exemplary, and is not intended to intimate that the scope of the disclosure, including the claims, is limited to these embodiments.

We claim:

1. A microprocessor capable of decoding a plurality of instructions associated with a plurality of threads, comprising:
   a first array comprising a first plurality of microcode operations associated with an instruction from the plurality of instructions, the first array capable of delivering a first predetermined number of microcode operations from the first plurality of microcode operations;
   a second array comprising a second plurality of microcode operations, the second array capable of providing one or more of the second plurality of microcode operations in the event that the instruction decodes into more than the first predetermined number of microcode operations and
   an arbiter coupled between the first and second arrays, wherein the arbiter determines which thread from the plurality of threads accesses the second array;
   wherein the first array provides an address within the second array in the event that the instruction decodes into more than the first predetermined number of microcode operations
   wherein the second array provides a second predetermined number of microcode operations, and in the event that the instruction decodes into more than the second predetermined number of microcode operations, then the second array provides a subsequent address within the second array to the arbiter.

2. The microprocessor of claim 1, wherein the arbiter is coupled to a first and a second address registers located between the first and second arrays, wherein the first address register stores an address from the second array and the second address register stores an address from the first array.

3. The microprocessor of claim 1, wherein the second array provides the second predetermined number of microcode operations in a first cycle of the microprocessor, and wherein the second array provides no further microcode operations in a second cycle of the microprocessor, wherein the first and second cycles of the microprocessor are sequential.

4. The microprocessor of claim 2, wherein the second array provides microcode operations for the instruction based on the addresses generated by both the first and second arrays, and wherein the second array provides an average of at least one microcode operation between successive cycles of the microprocessor.

5. The microprocessor of claim 1, wherein the first array is coupled to a second arbiter and the second arbiter selects a different thread for execution than the arbiter coupled between the first and second arrays.

6. A computer system comprising:
   a user input device;
   a microprocessor coupled to the user input device, the microprocessor capable of decoding a plurality of instructions associated with a plurality of threads, the microprocessor comprising:
      a first array comprising a first plurality of microcode operations associated with an instruction from the plurality of instructions, the first array capable of delivering a first predetermined number of microcode operations from the first plurality of microcode operations;
      a second array comprising a second plurality of microcode operations, the second array capable of providing one or more of the second plurality of microcode operations in the event that the instruction decodes into more than the first predetermined number of microcode operations; and
      an arbiter coupled between the first and second arrays, wherein the arbiter determines which thread from the plurality of threads accesses the second array;
      wherein the first array provides an address within the second array in the event that the instruction decodes into more than the first predetermined number of microcode operations;
      wherein the second array provides a second predetermined number of microcode operations, and in the event that the instruction decodes into more than the second predetermined number of microcode operations, then the second array provides a subsequent address within the second array to the arbiter.

7. The computer system of claim 6, wherein the arbiter is coupled to a first and a second address registers located between the first and second arrays, wherein the first address register stores an address from the second array and the second address register stores an address from the first array.

8. The computer system of claim 6, wherein the second array provides the second predetermined number of microcode operations in a first cycle of the microprocessor, and wherein the second array provides no further microcode operations in a second cycle of the microprocessor, wherein the first and second cycles of the microprocessor are sequential.

9. The computer system of claim 7, wherein the second array provides microcode operations for the instruction based on the addresses generated by both the first and second arrays, and wherein the second array provides an average of at least one microcode operation between successive cycles of the microprocessor.

10. The computer system of claim 6, wherein the first array is a programmable logic array and the second array is a memory array.

11. A method of decoding a plurality of instructions associated with a plurality of threads, the method comprising the acts of:

determining the complexity of at least one instruction within the plurality of instructions;

delivering a first predetermined number of microcode operations from a first array;

in the event that the instruction is complex, delivering a first address from the first array, the first address corresponding to the location of one or more additional microcode operations within a second array;

providing a second address from the second array, the second address corresponding to the location of one or more additional microcode operations within the second array;

arbitrating for access to the second array between using the first and second address; and providing the first address in the event that the instruction decodes into more than the first predetermined number of microcode operations;

providing a second predetermined number of microcode operations from the second array, and in the event that the instruction decodes into more than the second predetermined number of operations, then further comprising the act of providing the second address to an arbiter.

12. The method of claim 11, further comprising the act of providing the second predetermined number of microcode operations in a first cycle of a microprocessor.

13. The method of claim 12, further comprising the act of providing no further microcode operations in a second cycle of the microprocessor, wherein the first and second cycles of the microprocessor are sequential.

14. The method of claim 12, further comprising the act of providing microcode operations for the instruction from within the second array based upon both the first and second addresses, and further comprising the act of providing an average of at least one microcode operation between successive cycles of the microprocessor.

* * * * *